June 15, 1937.  D. H. J. VAN MAANEN  2,084,229
PROCESS FOR EXTRACTING JUICE FROM CUT SUGAR
BEETS AND OTHER GAS CONTAINING SUBSTANCES
Filed Oct. 17, 1934   5 Sheets-Sheet 2
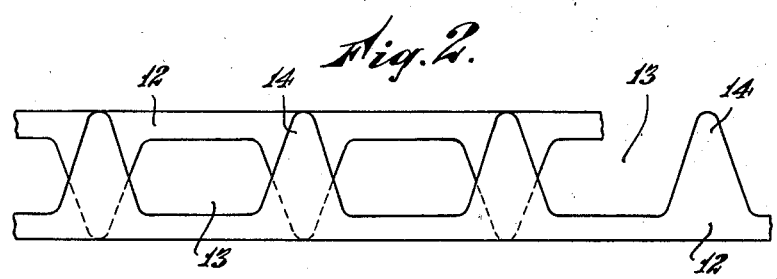
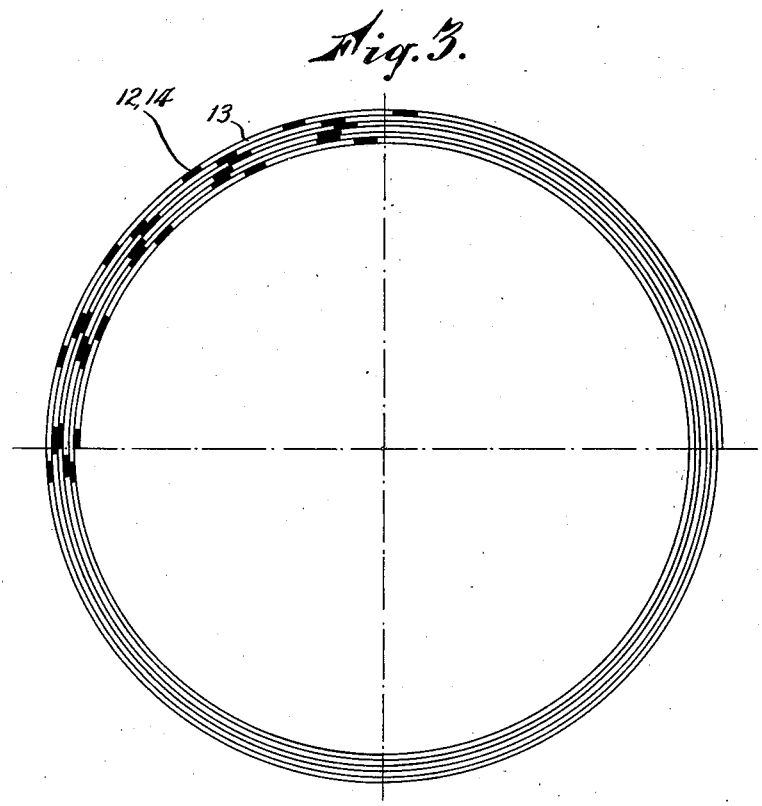

June 15, 1937.  D. H. J. VAN MAANEN  2,084,229
PROCESS FOR EXTRACTING JUICE FROM CUT SUGAR
BEETS AND OTHER GAS CONTAINING SUBSTANCES
Filed Oct. 17, 1934    5 Sheets-Sheet 3

D. H. J. Van Maanen
INVENTOR

By: Glascock Downing & Seebold
Attys.

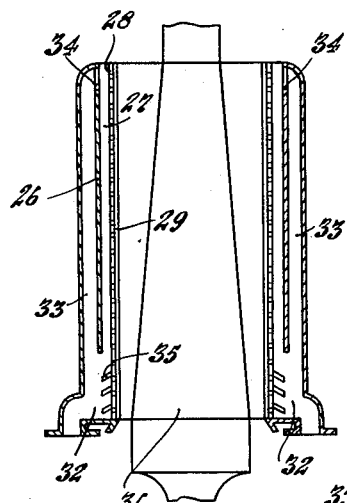
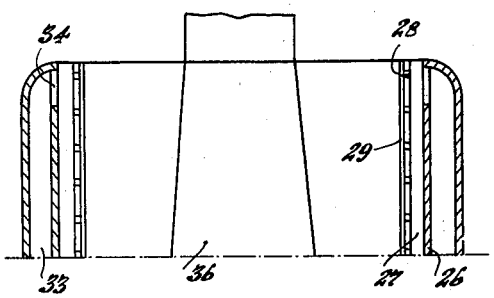
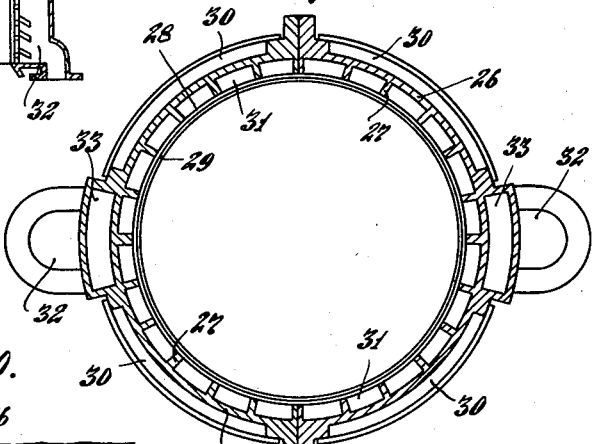
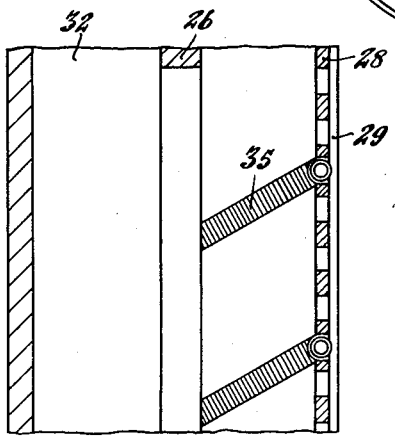

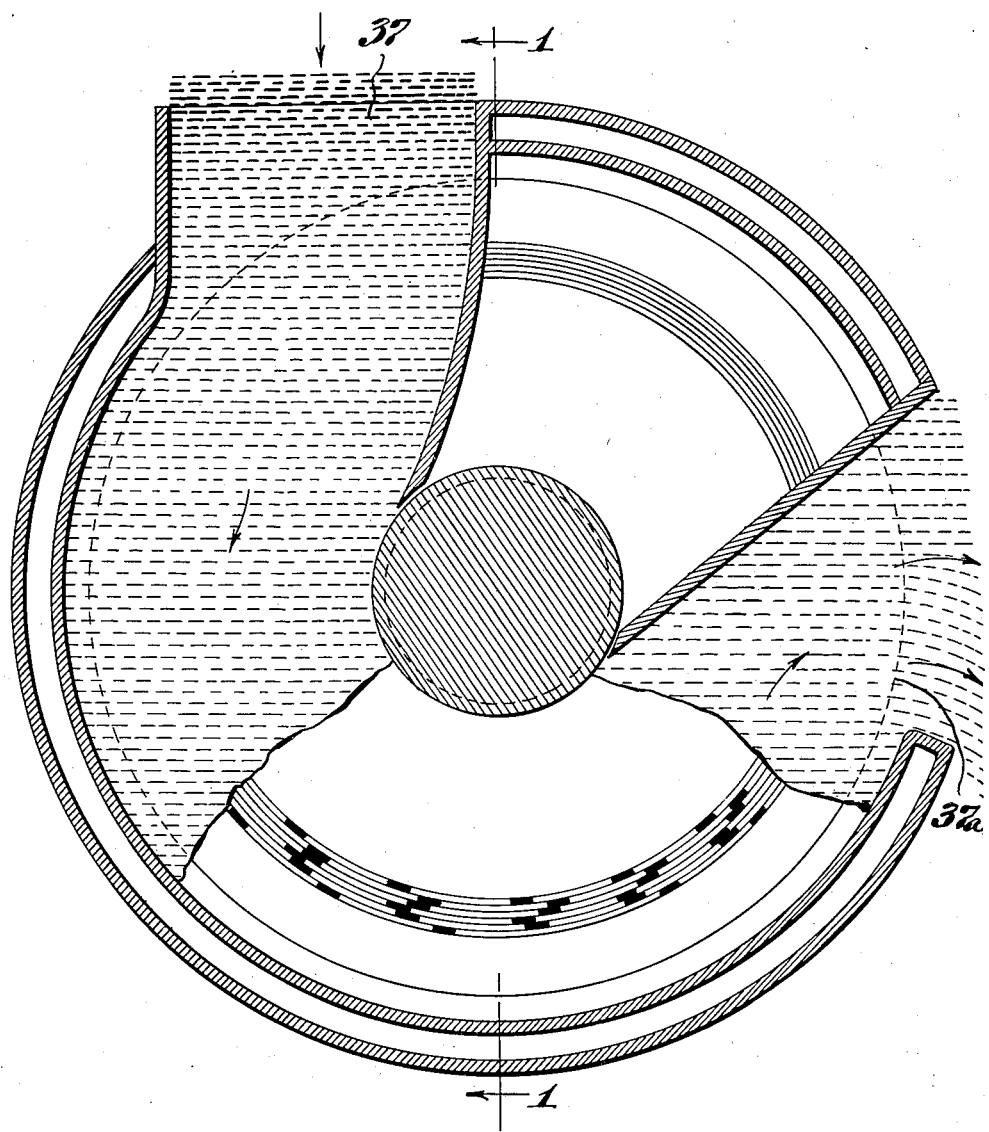

Patented June 15, 1937

2,084,229

UNITED STATES PATENT OFFICE

2,084,229

PROCESS FOR EXTRACTING JUICE FROM CUT SUGAR BEETS AND OTHER GAS CONTAINING SUBSTANCES

Dirk Hendrik Johan van Maanen, Berchem/Antwerp, Belgium

Application October 17, 1934, Serial No. 748,746
In Belgium November 7, 1933

1 Claim. (Cl. 100—38)

The invention relates to a method for the extraction of the juice from exhausted cut pieces of sugar beets, fresh cut pieces and other gas containing substances.

Up to the present it has not been possible to reduce the moisture contents of said substances in the known presses—presses of the Klusemann-type as well as of the Selwig-type—below approximately 78%; consequently most of the moisture has to be removed by evaporation in pulp drying chambers.

A press of the Klusemann type comprises a hollow conical shaft, provided with screw blades (screw of Archimedes) and rotating in a cylinder, the wall of which is perforated so that the expressed water may be drained through said wall, whereas the pressed out mass is pressed by the screw blades towards the narrow outlet opening, through which it leaves the press. Presses of this type are found in German Patents 3475 of January 18, 1879, Bergreen, and 70,725 of Sept. 19, 1893, Braunschweigische Maschinenbau Anstalt.

A press of the Selwig type comprises a pair of conical pressing discs both covered by perforated plates. The discs are mounted on two rotatable shafts making an obtuse angle with each other resulting in a structure in which the discs at the side of the re-entering angle are closer to one another than at the side of the salient angle. Now if both discs are rotated in the same direction and at the same speed, the mass therebetween will be forced towards a gradually narrowing space and will thereby be subjected to a very high pressure (see the German Patent No. 6199 of July 14, 1879, Selwig).

The invention has for its object to remove these drawbacks and to reduce as much as possible the moisture contents by direct pressure and to render the press controllable at will. It is based on the recognition of the fact that the gas contained in the mass to be expressed constitutes a great bar to the reduction of the moisture contents of the mass by pressure. In fact, if the mass is subjected to pressure and if it is simultaneously heated in the press, then, after some time, the temperature in the mass will be equal throughout the mass and when the pressure is increased, the enclosed air which has not wholly, but only partially been absorbed by the moisture in the mass will form an elastic pad preventing any extrusion of moisture.

In the mass a certain state of equilibrium is created, which renders impossible any further dehydration.

According to the invention a process is carried out, which is directed at the continuous disturbance of the state of equilibrium by uninterrupted and simultaneous heating and cooling of the mass at the same time exerting a progressively increasing pressure. This process may be carried out in presses of various types, e. g. in a continuous, rotary press or a press of conical type, a press of the Klusemann-type, etc., use being made of a filter having exceedingly fine filter slots and preferably having a specific construction which will be described hereinafter.

When carrying out this process it will depend on the relative value of the different substances whether the purpose will be to obtain the solid substance, the liquid or the gas, or a plurality thereof at the same time.

If the process is carried out in a press, then according to the invention the latter may comprise two cooled pressing surfaces and an intermediate heated filtering body. The temperature in this filtering body during the pressing operation is that of saturated steam, so that the gases will be compelled to escape from the liquid. The temperature decreases through the mass to that of the cooled pressing surface. If the pressure increases, the air and therewith liquid will escape at the plane of separation of the mass and the heated filtering member; a continuous movement of the air through the mass will then be produced in the direction from the cooled pressing surface toward the heated filtering body until all the air has been expelled. Thus a non-elastic mass is formed which permits the pressure to be increased to its maximum; consequently the liquid content of the mass is reduced to the desired degree of extraction.

If a continuous rotary or conical press is used for carrying into effect the process according to the invention, the pressure discs mounted on the inclined shafts do not as usual carry the filters; they are exclusively pressing discs serving at the same time for the cooling; to this end they may be provided with cooling ribs at the other side.

In order to discharge from the press the liquid as well as the air extracted from the mass, according to the invention a filtering body may be used, composed of a plurality of one or more spirally wound double bands. The double band comprises two similar bands, each at one edge provided with recesses alternating with teeth between said recesses; said bands are placed the one upon the other in such a manner that the teeth directed to opposite sides are superposed and that consequently the recesses coincide. Thus a filter open to all directions is obtained which will be explained more fully hereinafter with reference to the drawings.

When carrying out the invention in a press of the Selwig-type according to the invention the filtering disc is made of one or more parts and is provided with one or more heating chambers. This filtering disc is located opposite the cooling disc. The perforated plates may be supported by radial ribs of the filtering disc. In order to enable the moisture, the air or the gases to escape in case these ribs are in a horizontal position openings are provided in the ribs at various places.

When carrying out the invention in a press of the Klusemann-type the exterior jacket or pressing cylinder is at the exterior surrounded by one or more heating chambers, while the central shaft of the press is arranged so as to cool the mass by water or in any other manner. The interior wall of the jacket may carry perforated plates and a filter with slots, which may be supported by radial ribs.

The extracted moisture is discharged through one or more outlets at the bottom of the jacket communicating with the spaces between the interior wall and the perforated plates, while the air escapes upwardly through the same spaces and is discharged through suitable openings. The evacuating chambers are also extended towards the top of the press in order to facilitate the escape of the air or gases carried along by the outflowing liquid.

The invention will be more fully understood with reference to the accompanying drawings illustrating various embodiments of presses adapted to carry out the process according to the invention as well as a filter according to the invention adapted to be used in a conical press.

Fig. 2 is a plan view, partially broken away, of a pair of superposed bands or tapes for the filter.

Fig. 3 is a diagrammatical view showing such a pair of bands in spirally wound condition.

Fig. 7 is a more or less diagrammatical vertical section of a press of the Klusemann-type constructed in accordance with the invention.

Fig. 8 illustrates the upper portion of the jacket on a larger scale.

Fig. 9 is a horizontal section of this Klusemann-press on a larger scale.

Fig. 10 illustrates a detail on a larger scale.

Fig. 11 is a partial cross-section on line 11—11 of Fig. 1.

Figure 1:
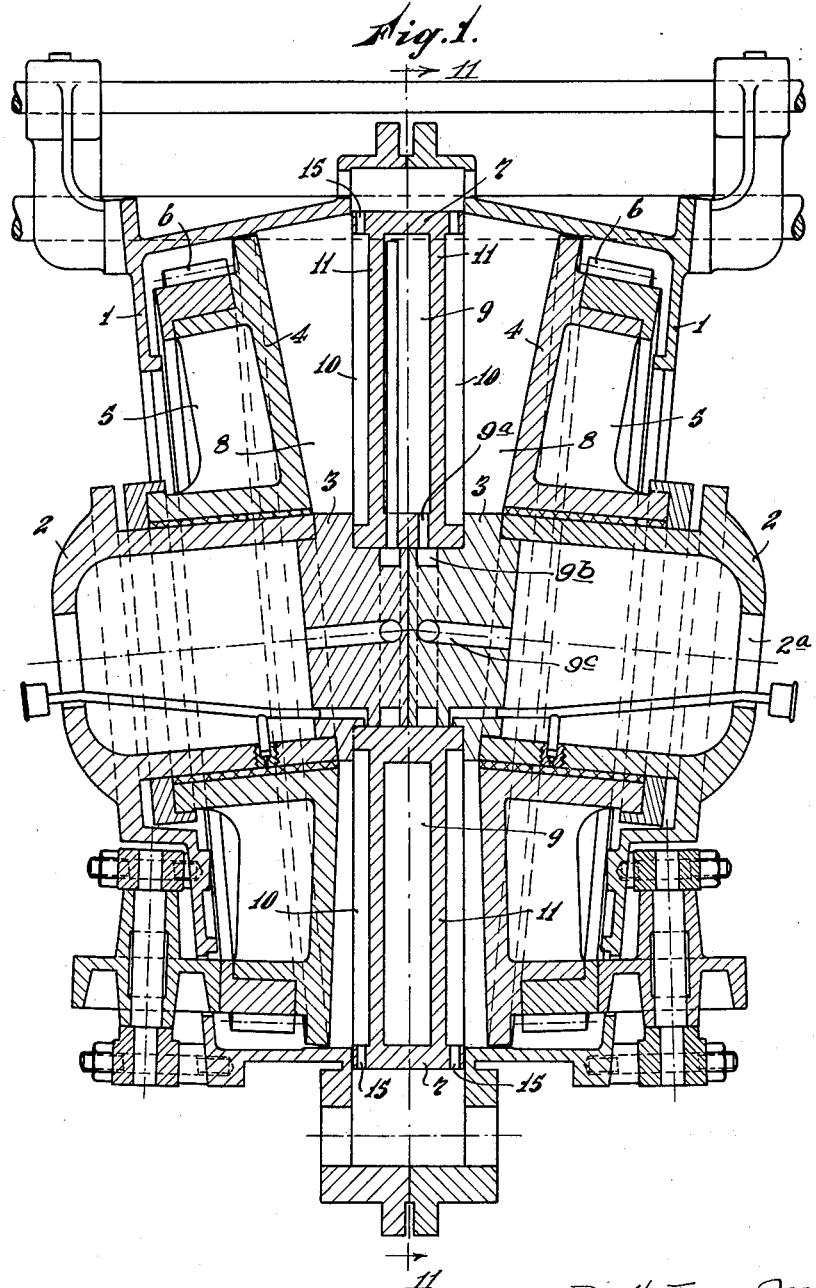
Fig. 1 is a section, in part an elevation on line 1—1 of Fig. 11, of a conical press.

The conical press shown (Figs. 1 and 2) has a cast iron two-part frame 1, 1 in which are mounted two shafts 2, 2 placed at an obtuse angle and between which a horizontal two-part filling piece 3, 3 is rigidly enclosed. The shafts and the filling piece constitute a support for the rotary part of the press. Upon the shafts 2, 2 are journalled pressure discs 4, 4 each of which is provided with cooling ribs 5, 5. The pressure discs are actuated by pinions (not shown) cooperating with the gears 6, 6. Between the two pressure discs 4, 4 the filtering disc 7 rotates either freely or is positively driven. In general the filtering disc will rotate freely and then it is carried along by the friction of the pulp mass which in operation is contained in the two pressure chambers 8, 8 and is therein moved in the same direction as the pressure discs 4, 4. By reason of the fact that the pressure chambers are growing narrower towards the outlet at the bottom of the press, the mass is subjected to the desired pressure. As in all presses of this type the outlet is located above the narrowest portion so that not only the discharge proceeds very easily but moreover the expressed substance can no more come into contact with the extracted liquid. The angle under which the axes of the hollow shafts 2, 2 are placed with respect to the two-part filling piece 3, 3 depends on the pressure to which the mass to be expressed is to be subjected.

The filtering disc 7 comprises a heating chamber 9 to which the heating medium, e. g. the steam, may be supplied or from which it may be discharged through the hollow shafts 2, 2 by passages 2a, 9c, 9b and 9a. In the opposite sides of the filtering disc 7 recesses or chambers 10, 10 are formed within which are arranged the filters to be described hereinafter with reference to Figs. 2 and 3.

Said filters are supported by the flat faces of the partitions 11, 11 separating the chambers 10, 10 and the heating chamber 9. These partitions may or may not be perforated.

The process according to the invention requires sieves of a very great fineness and large filtering capacity. The construction of a filter with slots adapted to carry out the above described invention, is illustrated in detail and by way of example in Figs. 2 and 3.

In Fig. 2 a very thin metallic tape or band 12 is provided with recesses 13 in one of its edges. Between the recesses 13 there are teeth 14. This band 12 is superposed upon another band absolutely identical therewith but placed so as to have its teeth directed oppositely. In Fig. 3 a double ribbon of this kind is spirally wound. Seeing that the diameter of a spiral winding is larger than that of the preceding spiral winding, the teeth of the successive spiral windings will, due to the winding, be somewhat shifted with respect to each other and consequently the recesses will be brought into communication with each other; this communication may be realized still more effectively by winding at the same time a plurality of pairs of bands shifted before hand. Another feature of the filter, spirally wound in this manner, consists in this that the number of recesses increases in the direction of winding.

The manner in which the recesses in the filter bands communicate with each other, appears from Fig. 3 illustrating in a longitudinal section of the filter bands the manner in which the recesses of the various spiral windings are shifted with regard to the recesses of other spiral windings.

The operation of the above described press is as follows:

The heating disc 7 is preheated; the press is then filled through a supply aperture 37 located at the widest portion. After having passed the filters, the air from the recessed filters is evacuated upwardly, whereas the extracted liquid flows through these filters and leaves the press at the bottom, passages 15 being provided for these purposes. The expressed mass, for example exhausted pulp, leaves the press through an outlet opening 37a.

Seeing that the air is evacuated in the first pressing phase and that the chamber grows narrower gradually, the pressure exerted on the now non-elastic pulp-mass, increases progressively from 0 to its maximum and consequently the press described operates without shocks at the outlet opening. As compared with a hydraulic press it has the advantage of a continuous operation.

Figure 5:
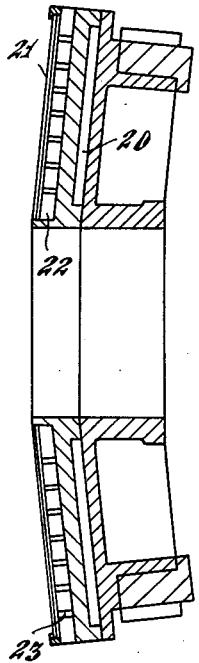
Fig. 5 is a section on the line 5—5 in Fig. 4 of this filtering disc.
Figure 4:
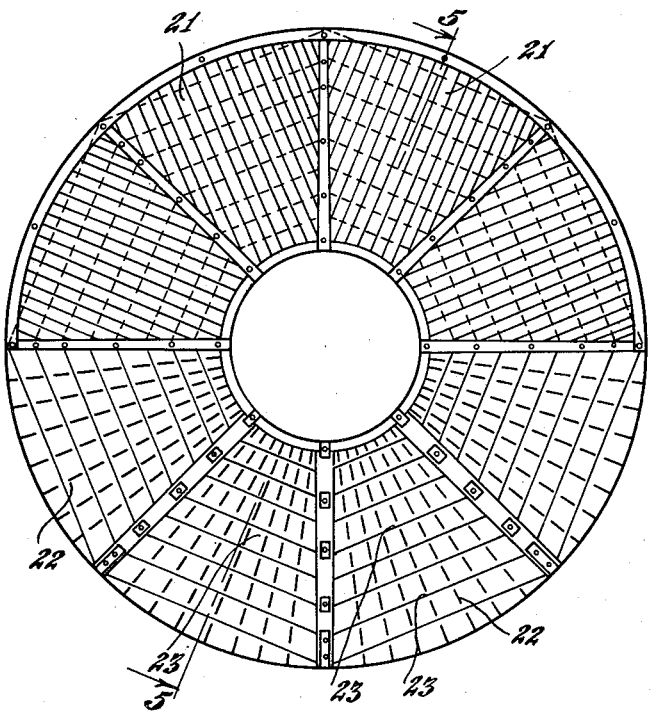
Fig. 4 is a more or less diagrammatic plan view of a filtering disc of a Selwig-press adapted to carry out the process according to the invention.
Figure 6:
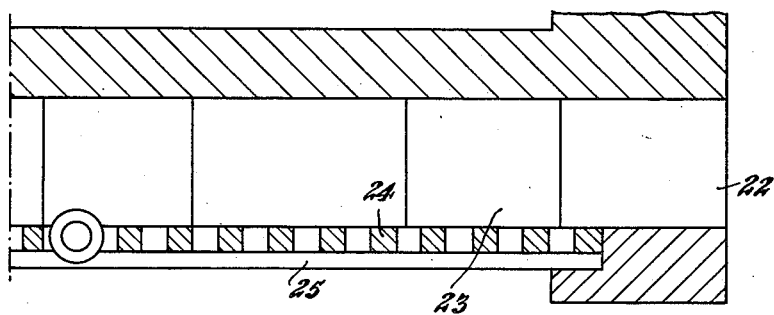
Fig. 6 illustrates a detail on a larger scale.

The filtering disc of the press of the Selwig-type shown in Figs. 4–6 may be constructed in one or two parts according as the heating medium chosen renders this necessary, and is provided with a heating chamber 20. The segment-shaped perforated plates 21 support the filter with fine slots and are supported by ribs 22, which, as appears from Fig. 4, are pierced at various places 23; the moisture, the air and the gases may escape through these openings even if the ribs occupy a horizontal position. The perforated plates are in a usual manner attached to the heating filtering disc. It follows from Fig. 6 in what manner a filter 25 having fine slots is placed upon an ordinary perforated plate 24. These two filters together are denoted by 21 in Figs. 4 and 5, Fig. 4, however, showing only the upper half thereof. Fig. 6 illustrates clearly the ribs 22 and the passages 23.

Facing the heating filtering disc there is a cooled pressing disc (not shown), the construction of which may be similar to that of the pressing disc shown in Fig. 4.

When using a press of the Klusemann-type (Figs. 7–10) the expressed moisture is received in accordance with the process in a heated cylindrical jacket 26 which may be made of cast iron and constructed in one or two parts, the interior wall of which carries longitudinal ribs 27, by which the filtering plates are supported, first an ordinary perforated plate 28 and then a filter 29 with fine slots. It appears from Fig. 9 that the jacket 26 is surrounded by a heating chamber 30, divided into two compartments, or into four if the jacket is made of two parts. The spaces between the ribs 27 in Fig. 9 communicate with each other at the bottom of the jacket and also with the discharge chamber 32; upwardly they communicate through passages 33 with the air discharge openings 34. In order to prevent the moisture after the extraction from remaining in contact with the pressed out substance the jacket is provided in its lower portion with a plurality of circular separating members, in this embodiment 35, which are downwardly inclined. Said members are shown on a larger scale in Fig. 10. The hollow tapering shaft 36 of the press, provided with helical pressing blades, is cooled by water or otherwise and serves at the same time as the cooling body. To this end the shaft is entirely closed with the exception of the openings for the supply and discharge of the cooling medium.

I claim:

A process for the extraction of liquid from air or gas containing substances consisting of relatively coarse parts, forming a loose incoherent mass, the free spaces of which are air or gas filled, which comprises removing the air or gases and the liquid from the mass by introducing the mass into a pressing chamber growing narrower from the inlet to the outlet and having oppositely located pressure surfaces, causing a volume of said substances to be pressed to decrease the same in size taperingly from the inlet to the outlet end thereof in a vertical direction while causing the substances to be filtered horizontally through only one surface, applying heat at the said surface, applying pressure laterally to the substances, cooling at the opposite surface to thereby maintain a difference of temperatures between the cooling and heated surfaces and simultaneously causing flow laterally of gases to be eliminated from the substances filtered, thereby maintaining a substantially uniform and continuous flow downwardly of the substances being pressed.

DIRK HENDRIK JOHAN van MAANEN.